Feb. 26, 1957     C. S. CUSICK ET AL     2,782,576
APPARATUS FOR DISPENSING PLASTER
Filed Dec. 13, 1954     3 Sheets-Sheet 1

INVENTORS
CHARLES S. CUSICK and
ROBERT V. LANGE

Oscar L. Spencer
ATTORNEY

Feb. 26, 1957 C. S. CUSICK ET AL 2,782,576
APPARATUS FOR DISPENSING PLASTER
Filed Dec. 13, 1954 3 Sheets-Sheet 2
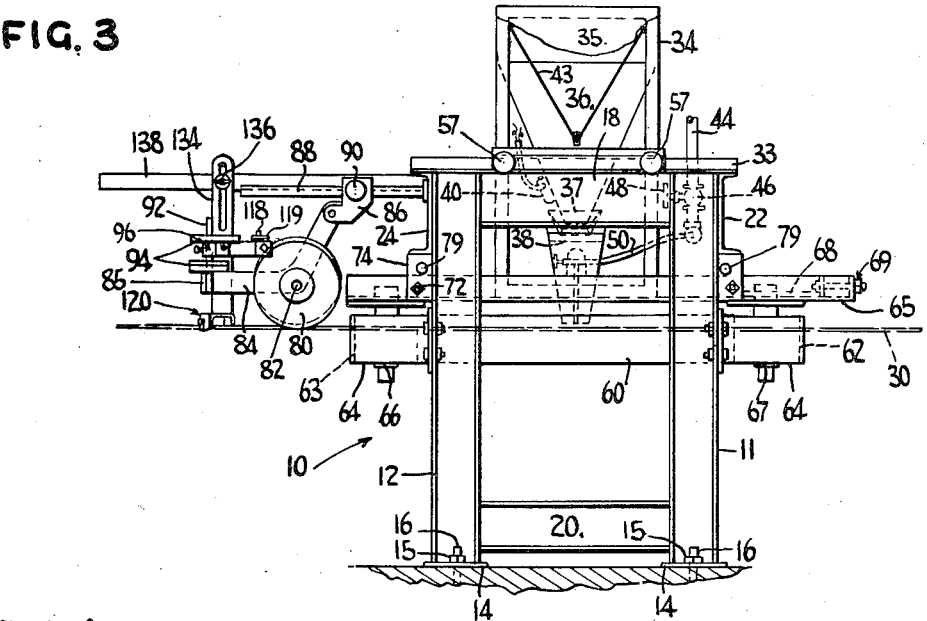
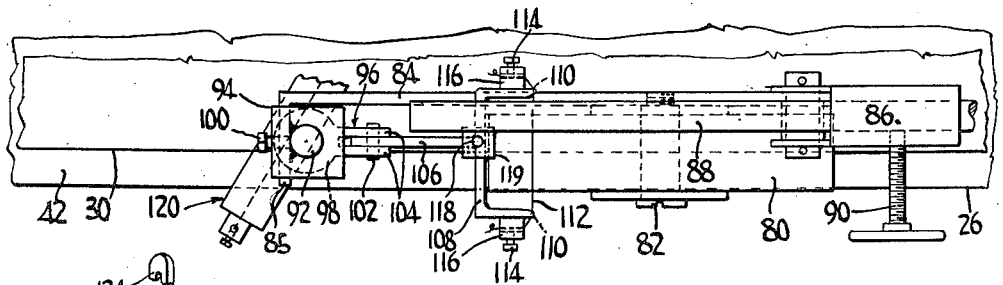
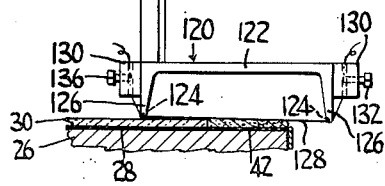
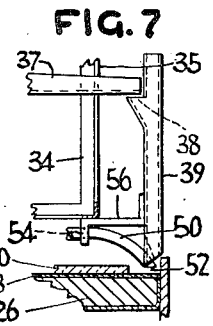
INVENTORS
CHARLES S. CUSICK and
ROBERT V. LANGE
Oscar L. Spencer
ATTORNEY Feb. 26, 1957 C. S. CUSICK ET AL 2,782,576
APPARATUS FOR DISPENSING PLASTER
Filed Dec. 13, 1954 3 Sheets-Sheet 3

INVENTORS
CHARLES S. CUSICK and
ROBERT V. LANGE

Oscar H. Spencer
ATTORNEY

United States Patent Office 2,782,576
Patented Feb. 26, 1957

2,782,576

APPARATUS FOR DISPENSING PLASTER

Charles S. Cusick and Robert V. Lange, Ford City, Pa., assignors to Pittsburgh Plate Glass Company Application December 13, 1954, Serial No. 474,758

5 Claims. (Cl. 51—277)

This invention relates to apparatus for dispensing plaster and is particularly concerned with such a method and apparatus when used in conjunction with preparing rough rolled plate glass for grinding and polishing.

In the manufacture of plate glass by a continuous process, rough rolled glass is ground and polished on flat tables formed from rectangular cars, usually made of cast iron, which are coupled together to form a continuous elongated surface of uniform width sometimes extending more than 1,000 feet in length. These cars are mounted for movement along tracks. The rough rolled glass in the form of large sheets is supported and held in a horizontal position on the continuous surface formed by the grinding and polishing tables by means of thin beds of plaster of Paris, which are mixed with water and spread over the tops of the cars shortly before the sheets of glass are laid thereon. The plaster sets quickly and holds the glass firmly on the tables. A conveyor moves the continuous line of cars carrying the sheets of rough rolled glass beneath grinding and polishing machines which finish the exposed upper surface of the glass.

After the upper surface has been smoothed by this finishing operation, the glass and the plaster are removed from the tables, new supporting beds of plaster are spread upon the tables and the glass sheets are laid upon the plaster to expose their unpolished surfaces. The cars then pass beneath a second set of grinders and polishers to finish the exposed upper surace of the embedded glass sheets.

In order to insure that the exposed surfaces of the glass sheets are ground and polished uniformly, it is necessary that each increment of glass conveyed beneath the grinders and polishers be ground and polished uniformly across its entire width. This necessitates that the area covered by the polishing tools exceed in width that of the glass to be surfaced. When glass sheets are laid upon the plaster bed as described above, there is an abrupt change in height substantially equal in thickness to that of the glass sheet at each edge of the glass sheet to be surfaced. This abrupt edge is subject to spalling upon being abraded by the grinders. Such spalling results in rejection of the glass due to optical and structural defects. Furthermore, the sharp edges of the glass are likely to damage the relatively soft felts of the glass polishing machines as the latter brush over the edges of the glass sheets during the polishing phase of the surfacing operation.

We have discovered that these troubles during grinding and polishing may be minimized by providing a border of plaster along each lateral edge of the glass sheets. The thickness of these borders at the glass-plaster interface preferably should equal the thickness of the glass. This plaster border must have a horizontal upper surface at its interface with the glass that is in the same plane as the rough rolled glass sheet. Therefore, support is provided for the edges of the glass sheets in the regions where glass failure is likely to occur. Also, by eliminating abrupt edges from the glass, the useful life of the polishing felts has been extended considerably.

We have also developed an apparatus capable of applying the edge border described above. This apparatus includes an endless belt mounted on free-running pulleys and caused to rotate by frictional engagement of the pulleys against an edge of the continuous tables, a dispenser for applying accelerator fluid into the channel formed between the belt and the edge of the glass, a plaster hopper for applying plaster of Paris into the same channel, a tamping wheel to adjust the thickness of the plaster border to that of the glass, and scraping means for removing any excess plaster so that the thickness of the plaster border conforms to that of the rough rolled sheets of glass, especially at the interface along the edge of the glass.

Accordingly, it is an object of our invention to provide a novel method of preparing rough rolled glass for surfacing involving the application of an edge border of plaster having a thickness such that its upper surface conforms to the upper surface of the glass to be ground and polished.

Another object of the present invention is to provide an apparatus capable of applying an edge border of plaster automatically.

These and other objects of the present invention will become obvious from the description of a particular apparatus suitable for their attainment. It is understood that the description of this particular apparatus is for purposes of illustration rather than limitation. This description will be better understood when studied in conjunction with the accompanying drawings, wherein:

Figure 3 is a side elevational view of the apparatus as shown in Figures 1 and 2;

Figure 4 is an enlarged detailed view of a tamping wheel and a portion of an excess plaster remover which form part of the apparatus;

Figure 5 is a rear elevational view taken along the lines V—V of Figure 1 of an excess plaster remover used in the apparatus;

Figure 6 is a top plan view of the element shown in Figure 5;

Figure 7 is a rear elevational view of certain details of the dispensing elements utilized in the apparatus and seen generally along the lines VII—VII of Figure 1;

Figures 8A and 8B are fragmentary sectional views of the edges of a sheet of glass carried beneath a grinder during the surfacing operation and are composed of two sections, Figure 8A disclosing how glass sheets have an abrupt edge in the absence of the edge border, and Figure 8B showing the smooth edge provided when a plaster border is applied according to the teachings of the present invention;

Figure 1:
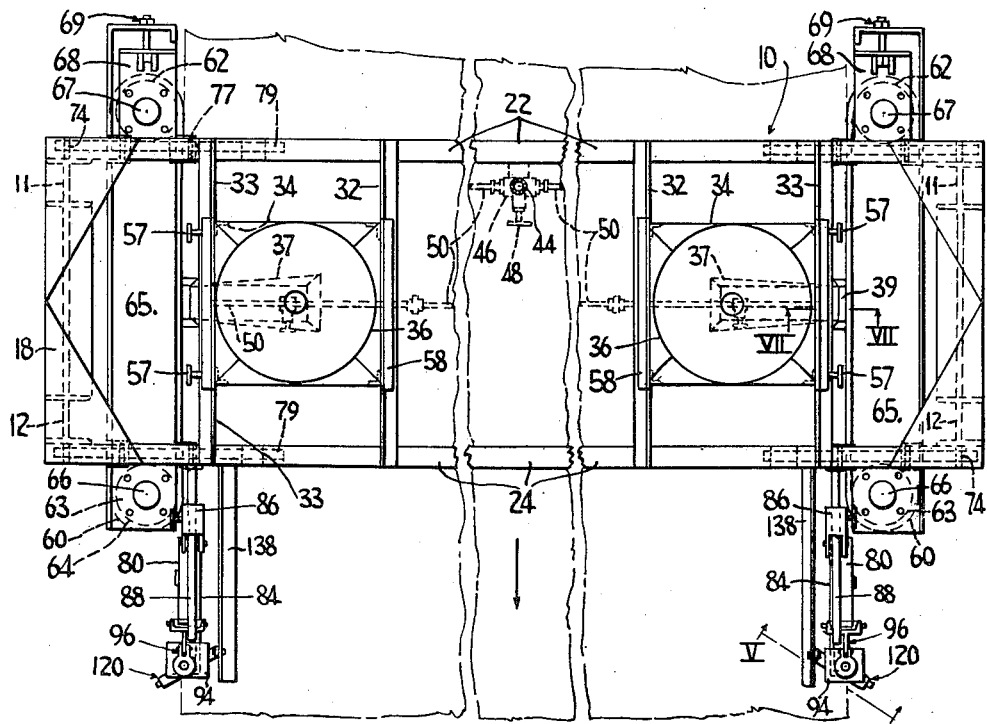
Figure 1 is a plan view of the apparatus with certain portions of the apparatus removed to clarify the important elements of the structure disclosed.

Referring to the drawings, the apparatus depicted generally by reference number 10 comprises front and rear H-shaped columns 11 and 12 respectively, each having a horizontally disposed base 14 which is secured to a floor by nuts 15 and screw threaded bolts 16 countersunk into the floor, for example. The columns are reinforced by upper girders 18 and lower girders 20 extending horizontally between the front and rear columns at each side. The columns and girders form a pair of structures interconnected at their upper ends by a front bridge beam 22 and rear bridge beam 24.

The bridge beams 22 and 24 extend transversely of and above the path of moving tables 26 provided with a continuous thin bed of plaster of Paris 28 which secures sheets of glass 30 in fixed relation to the table during the grinding and polishing operations. Reinforcement girders 32 and end beams 33 interconnect the bridge beams 22 and 24.

The reinforcement girders 32 and end beams 33 also serve to support frames 34 which may be enclosed by walls to form boxes 35. Funnel shaped plaster containers 36 are suspended from the frames 34. The latter are located adjacent each edge of the bridge formed by the bridge beams. At the bottom of each container 36 is a trough 37 terminating adjacent, and communicating with, an inlet 38 of a vertical drop chute 39.

A vibrator 40 which is fixed to the container 36 and a controller 41 attached to the trough 37 combine to deposit the plaster from the container to the drop chute, and from the latter onto an edge portion 42 of table 26 extending beyond the lateral edge of the glass sheets 30. The structure and operation of the vibrators 40 and controllers 41 will be described in greater detail below. As the tables pass beneath the plaster dispensers, a swath of pulverized plaster is deposited atop each lateral edge 42 of tables 26. The speed of depositing the plaster may be regulated according to the speed of table movement past the drop chutes and the thickness of the glass to be surfaced.

For our particular purposes, we have found that a Syntron controller type FMCO Style 4481 used in conjunction with a Syntron feeder type CFM 030 Style 1693 is suitable to feed and control the flow of plaster. The particular details of these elements do not constitute part of our invention, but will be described for purpose of supplying a complete description of the apparatus.

Figure 9:
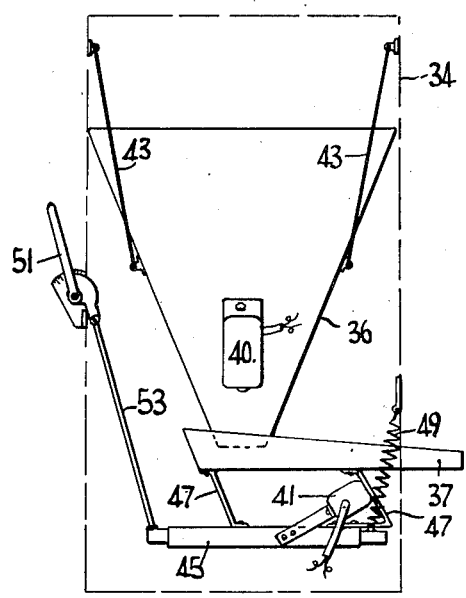
Figure 9 is an enlarged elevational view showing certain structural details of a typical plaster dispenser apparatus suitable for use in the present apparatus.

Referring to Figure 9, frame 34 is attached to container 36 containing a supply of pulverized plaster by means of cables 43. The vibrator 40 is attached to a source of electrical energy (not shown) to cause vibration of the container.

Trough 37 located beneath container 36 is attached to a movable supporting member 45 by obliquely disposed leaf springs 47. A spring 49 connects one end of the support member 45 to frame 34. The other end of the support member 45 is connected to a rotatable handle 51 by means of a linking bar 53. Controller 41 is fixed to a support brace which comprises certain of the oblique leaf springs 47 interconnecting trough 37 and support member 45. Controller 41 is actually a vibrator which, upon the application of electrical current causes vibration of the trough 37. Rotation of handle 51 acts through the linking bar 53 to adjust the slope of the trough 37, thereby controlling the amount of plaster dispensed through the trough.

In order to insure that the deposited plaster sets quickly when mixed with water, it is necessary that an accelerator such as $K_2SO_4$ be dissolved in the water. Acceleration of the plaster setting is also provided by mixing a mechanical accelerator, such as ground gypsum sold under the trade name Terra Alba, with the pulverized plaster. The accelerator solution is mixed and stored in a tank (not shown). Pipe 44 conveys the accelerator solution by gravity flow to a junction 46. A valve 48 at the junction controls the flow of the solution into a pair of conduits 50, which extend transversely of the axis of movement of the tables in opposite directions toward the edges of the latter. Each conduit 50 terminates in an outlet orifice 52 located adjacent the edge 42 of the table 26. The conduits 50 are passed through apertures 54 in the vertical leg of a Z-shaped support beam 56 attached to box 35.

Boxes 35 are secured to the end beams 33 by members 57. Also, Z-shaped beams 58 are secured to the laterally inner vertical wall of the boxes 35 to enable the latter to rest upon reinforcement braces 32.

In order to insure that the deposit is limited to the edges of the table, the drop chute 39 is in the form of an open slot extending parallel to the axis of movement of the tables and a vertically disposed endless belt 60 is tensioned between a front pulley 62 and a back pulley 63 along each side of the tables 26. Belt 60 closes the slot as it moves past the drop chute opening. A pulley guide 64 is secured to each of the columns 11 and 12 to insure that the pulleys maintain the top of the belt above the top of table edge 42.

Each pulley is free to rotate about a vertically directed axle. The axle for each rear pulley 63 extends upwardly and is fixed to an axle housing 66 fixed to a longitudinal L-beam 65. The axle housing 67 of each front pulley 62 fits through an aperture in L-beam 65 to engage a slidable flanged plate 68 secured to a screw actuated belt tensioner 69 locked in place by nuts. Rotation of the screw of the belt tensioner 69 moves the flanged plate 68 longitudinally to modify the tension of belt 60.

Each axle housing 66 is also secured to a laterally extending J-shaped member 70. The latter is apertured at its broad end to receive a shaft 72 in rigid engagement. The shaft, in turn, slides through an opening 73 in a flange 74 depending from the bottom of each bridge beam. A stop 75 limits inward movement of shaft 72. A compression spring 76 is wound about the shaft 72 to urge the J-shaped member 70 away from the flange 74. Such urging forces each belt into frictional engagement with the edge of the moving table, thus causing the belts to rotate freely and form a moving vertical wall that delimits the outer edge of the strip of plaster deposited upon the moving tables. The plane of lateral movement of the pulleys caused by the urging of springs 76 is controlled by attaching eye bolts 77 to the upper flange 78 of each J-shaped member 70. The eyes of the eye bolts are fixed to rods 79. Flanges 74 act as bearing plates for the rods, while bearing lugs 81 depending from the bridge beams 22 and 24 are apertured to receive the rods in sliding relation. The free movement of the pulleys in frictional engagement with the sides of the tables 26 extends their life considerably, since the wear due to friction, which would occur if the belts were fixed, is minimized.

The Syntron vibrators 40 are regulated so that the thickness of the plaster strip deposited through the drop chute exceeds that of the glass sheets. The belts 60 form an alley at each edge of the glass of such length that the plaster slurry produced by depositing the plaster and the accelerator solution sets sufficiently by the time the tables move from the depositing station to the rear of pulleys 64 to form a rough edge border of plaster.

The rough plaster edge border moves with the tables beneath a tamping wheel 80, which is freely rotatable on a shaft 82. The latter is mounted on a bell crank arm 84 which, in turn, is swivelly connected to a bracket 86 slidably mounted on a rod 88. Set screws 90 fix the bracket 86 to the rod 88. At the rear end of the bell crank arm 84 is a flange 85. A vertically extending post 92 is welded to the flange. Weights 94 may be mounted on the post to adjust the pressure applied by tamping wheel 80.

A tamping wheel scraper 96 is provided, consisting of a bifurcated eye member 98 clamped by a set screw 100 about post 92 at its eye and by a bolt 102 at its bifurcations 104 to an arm 106 of a wire holder 108. The latter is U-shaped and contains apertures 110 at each extremity. A wire 112 tensioned between set screws 114 mounted in apertured housings 116 of the wire holder scrapes against the tamping wheel 80 to remove excess plaster that may be deposited on its periphery as it rotates relative to the plaster. An additional vertical post 118 extends upwardly from the base of the wire holder 108 to support weights 119. The latter are added to the post when desired to provide more intimate contact between the scraper wire and the periphery of the tamping wheel 80 as the latter becomes worn.

Figure 2:
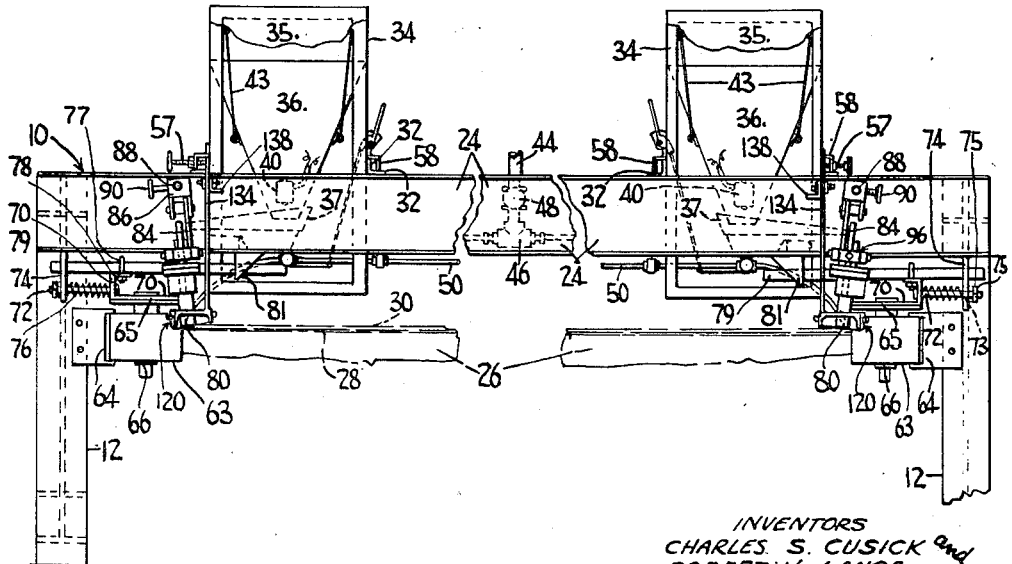
Figure 2 is a rear elevational view of the apparatus of Figure 1 with certain portions broken away for clarity.

The tamping wheels are preferably canted as shown in Figure 2 and are located in such positions that they are aligned with each edge of the glass sheets conveyed along the moving tables, with a portion of each wheel above the respective edge of the glass and a portion of each wheel extending beyond the glass edge. By virtue of the weight of the wheel itself plus the added pressure supplied by the weights 94, movement of the glass carrying tables 26 beneath the free runnnig wheels 80 causes the latter to move by friction. Canting the wheels in the manner shown insures that the thickness of the plaster border at the glass-plaster interface is such that the upper surfaces of the rough glass and the plaster coincide at the interface.

Therefore, as seen clearly in Figures 8A and 8B, when a plaster edge border of the proper thickness is prepared, there is no abrupt surface change at the edge of the glass such as depicted in Figure 8A. Instead, the edge of the glass is reinforced as shown in Figure 8B. It is also obvious from a comparison of Figures 8A and 8B that when no plaster edge border is provided, polishing felts passing over the relatively sharp corners of the glass edges tend to be damaged thereby, whereas the addition of plaster edge borders provides a smooth edge of a relatively soft material which contacts the rotating felts with relatively no harm to the latter.

A proper thickness of the plaster edge border is required to insure optimum efficiency in glass surfacing operations. If the plaster edge border is too thin, the edge of the glass adjacent the plaster border is not protected fully from spalling due to rotating the grinders against the upper glass surface. If the plaster border is too thick, then the shearing action of the surfacing tools rotating beyond the edges of the glass is likely to remove chunks of such size from the plaster that the edges of the glass sheets become subject to the danger of spalling and the polishing felts to being cut.

During the tamping operation just described, the dispensed plaster, which has been deposited below the slot formed between the vertical drop chute 39 and the endless belt 60, is brought into more intimate contact with the accelerator solution and is compressed to from a border of greater strength than one which is not compressed. During this compression, some of the surplus plaster originally deposited escapes the tamping action. This surplus plaster must be removed before it hardens. A surplus plaster remover 120 located immediately beyond the tamping wheel 80 is provided for this purpose.

The remover 120 comprises a U-shaped member 122 having grooves or apertures 124 at its extremities 126 between which a wire 128 is held in tension. Each leg of the U-shaped member contains an apertured housing 130, the apertures of which receive the opposite ends of the wire 128. Set screws 132 maintain the wire in fixed position and in a desirably taut condition.

The U-shaped member 122 is fixed as by welding to a slotted, vertically extending elongated plate 134. The slotted portion of the plate is secured at 136 to a rearwardly extending brace 138 attached rigidly at its forward end to the rear bridge beam 24. The plaster remover 120 is angled as shown in Figure 4 to insure that the trimmed plaster is pushed outside the tables after trimming.

Figure 10:
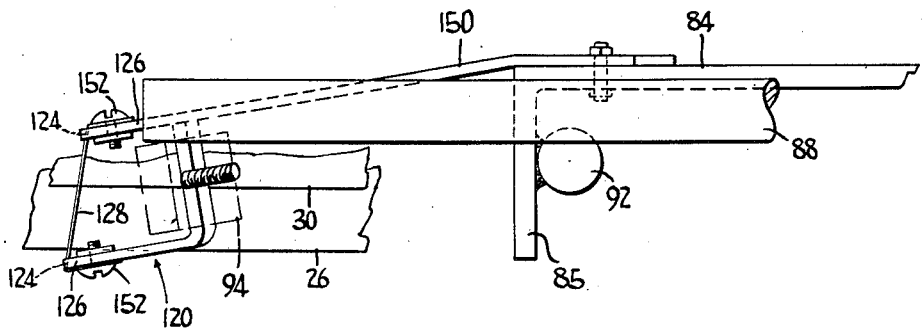
Figure 10 is a plan view showing an alternate means of attaching an excess plaster remover to the apparatus.

Referring to Figure 10, an alternate embodiment for attaching the plaster scraper 120 to the apparatus is shown. In this embodiment an angular bar 150 is secured to the bell crank arm 84 and to the laterally inner extremity 126 of the excess plaster remover 120. The wire 128 extending between the apertures 124 of the remover extremities 126 is mounted so that each of its extremities is tightly held between a head of a screw 152 and an outer side of a scraper extremity 126. By attaching the excess plaster remover directly to the yoke which supports tamping wheel 80, the level of the plaster after the excess is removed coincides with the upper surface of the tamped plaster.

Another benefit obtained from the application of the plaster edge border is additional assurance that the glass sheets will not separate from the table on which they are mounted due to the action of the surfacing tools. Sometimes, when the consistency of the plaster bed upon which the glass sheets are laid is made too little due to variations in the plaster-water proportions, the glass-plaster bond is broken by this action. The provision of relatively thick plaster edge borders maintains the glass sheets on the tables in some instances when the plaster bed is not sufficiently strong to secure the glass onto the tables.

Still another function performed by the edge borders is to act as a barrier preventing the flow of water beneath the glass sheets and the plaster bed. If water were free to enter these interfaces, the adhesion of the plaster bed to the table would lessen, thus providing an opportunity for the glass sheets to slide off the tables. However, the main functions performed by the plaster edge borders of our invention are to provide a smooth extension of rough rolled glass sheets in the form of a plaster edge less likely to damage the felts used to polish the glass and to minimize glass breakage resulting from exposure of unsupported glass edges to the action of rotating grinders.

What is claimed is:

1. In combination with apparatus for depositing thin strips of plaster along the margins of the upper surface of a horizontally moving glass sheet supporting member having a width greater than that of the supported sheet and including plaster dispensing means disposed above and aligned with the exposed marginal edges of the supporting member, the improvement comprising spaced shaft support housings located beyond the plaster dispensing means along the path of movement of the supporting member, a shaft carried by each support housing, and a tamping wheel rotatable about each shaft and having a peripheral surface including a portion aligned with an exposed marginal edge of the glass sheet supporting member and a portion extending laterally inwardly of the exposed marginal edge to provide rolling contact with the dispensed plaster strips to compress the latter to a thickness equal to that of the supported glass sheet at the glass-plaster interface.

2. The improvement according to claim 1, wherein the peripheral surfaces are mounted obliquely relative to the upper surface of the supporting member so that their laterally outward extensions form an acute angle therewith.

3. The improvement according to claim 1 including means for weighting each tamping wheel.

4. The improvement according to claim 1, wherein each shaft is mounted obliquely relative to the glass sheet supporting member and each tamping wheel is in the form of a disc mounted on its respective shaft.

5. The improvement according to claim 1, including a scraping member aligned longitudinally beyond each tamping wheel in the path of movement of said supporting member.

References Cited in the file of this patent
UNITED STATES PATENTS

| Number | Name | Date |
|---|---|---|
| 1,194,520 | Lewis | Aug. 15, 1916 |
| 1,631,203 | Hitchcock | June 7, 1927 |
| 1,895,934 | Leyland | Jan. 31, 1933 |
| 1,934,794 | Fisher | Nov. 14, 1933 |
| 2,212,351 | Moran | Aug. 20, 1940 |
| 2,363,631 | Walters | Nov. 28, 1944 |